(12) United States Patent
Hilmer et al.

(10) Patent No.: US 7,842,392 B2
(45) Date of Patent: *Nov. 30, 2010

(54) ARTICLE COMPRISING POLYSTYRENE AND THERMOPLASTIC POLYURETHANE

(75) Inventors: Klaus Hilmer, Brockum (DE); Leo Hoffmann, Fürth (DE)

(73) Assignee: BASF SE, Ludwigshafen (DE)

( * ) Notice: Subject to any disclaimer, the term of this patent is extended or adjusted under 35 U.S.C. 154(b) by 98 days.

This patent is subject to a terminal disclaimer.

(21) Appl. No.: 11/816,322

(22) PCT Filed: Feb. 21, 2006

(86) PCT No.: PCT/EP2006/060147

§ 371 (c)(1),
(2), (4) Date: Aug. 15, 2007

(87) PCT Pub. No.: WO2006/089892

PCT Pub. Date: Aug. 31, 2006

(65) Prior Publication Data

US 2008/0258352 A1 Oct. 23, 2008

(30) Foreign Application Priority Data

Feb. 22, 2005 (DE) .................. 10 2005 008 260

(51) Int. Cl.
*B32B 27/40* (2006.01)
*C08L 75/04* (2006.01)
(52) U.S. Cl. ................. 428/424.2; 428/423.1; 264/478; 264/483

(58) Field of Classification Search ............. 428/423.1, 428/424.2; 264/478, 483
See application file for complete search history.

(56) References Cited

U.S. PATENT DOCUMENTS

| 4,737,379 A * | 4/1988 | Hudgens et al. ............. 427/575 |
| 4,816,313 A | 3/1989 | Hosokawa et al. |
| 6,013,153 A | 1/2000 | Koinuma et al. |
| 6,080,473 A | 6/2000 | Oriseh et al. |
| H1978 H * | 8/2001 | Freiburger et al. ............ 156/78 |
| 6,497,782 B1 * | 12/2002 | Platz et al. .................. 156/245 |
| 6,585,373 B2 * | 7/2003 | Evans et al. .................. 351/163 |
| 7,192,621 B2 * | 3/2007 | Motegi ........................ 427/155 |
| 7,241,854 B2 | 7/2007 | Pohlmann et al. |
| 2002/0109263 A1 | 8/2002 | Goldbach |

FOREIGN PATENT DOCUMENTS

| DE | 2302564 | 7/1974 |
| DE | 10308727 B3 | 6/2004 |
| DE | 10308989 A1 | 9/2004 |
| EP | 0355001 A2 | 2/1990 |
| EP | 1036651 A1 | 9/2000 |
| GB | 1403693 | 8/1975 |
| TW | 572 825 | 1/2004 |
| WO | WO 03/014179 A1 | 2/2003 |

OTHER PUBLICATIONS

Amesöder, S. et al. "Plasma Sorgt für Festen Verbund", Kunststoffe, 2003, vol. 93, No. 9, 124-129.

* cited by examiner

*Primary Examiner*—Thao T. Tran
(74) *Attorney, Agent, or Firm*—Connolly Bove Lodge & Hutz LLP

(57) ABSTRACT

Articles comprising polystyrene and thermoplastic polyurethane joined adheringly without chemical adhesion promoter.

15 Claims, No Drawings

ARTICLE COMPRISING POLYSTYRENE AND THERMOPLASTIC POLYURETHANE

RELATED APPLICATIONS

This application is a national stage application (under 35 U.S.C. §371) of PCT/EP2006/060147, filed Feb. 21, 2006, which claims benefit of German application 10 2005 008 260.2, filed Feb. 22, 2005.

The invention relates to articles comprising polystyrene and thermoplastic polyurethane joined adheringly without chemical adhesion promoter, preferably articles comprising articles based on thermoplastic polyurethane joined adheringly to articles based on polystyrene. "Without chemical adhesion promoter" means here that between the thermoplastic polyurethane and the polystyrene there is no further component (adhesion promoter or coupling agent), in other words no component which differs from the polystyrene and the thermoplastic polyurethane, and in particular no adhesive. In the article of the invention the polystyrene and thermoplastic polyurethane components are separate but joined to one another adheringly. The articles of the invention, therefore, are not based on a mixture comprising polystyrene and thermoplastic polyurethane. The invention further pertains to processes for producing an article comprising thermoplastic polyurethane and polystyrene, which involves plasma-treating the surface of a polystyrene article and then contacting the thermoplastic polyurethane, preferably in the melted state, with the plasma-treated surface, preferably attaching it by means of injection molding. The invention also relates to articles obtainable in this way and comprising thermoplastic polyurethane and polystyrene. The general expression "polystyrene" comprehends, in this text, not only the actual, standard polystyrene (GPPS) but also HIPS and known ABS and ASA plastics.

Thermoplastics are plastics which, when the material is repeatedly heated and cooled within the temperature range typical for processing and application, remain thermoplastic. Thermoplasticity is the property by virtue of which a plastic softens repeatedly on heating within a temperature range typical for it and hardens on cooling, and which in the softened state can be repeatedly shaped via flow in the form of a molding, extrudate or formed component, to give a semifinished product or finished articles. Thermoplastics are widespread in industry and are found in the form of fibers, sheets, films, moldings, bottles, sheathing, packaging, etc.

For numerous applications it is desirable to combine different thermoplastics in one article. Reasons for this arise as a result of the differing requirements placed on the surface, in respect, for example, of tactility and optical qualities, on the one hand, and, on the other hand, on the strength or stiffness and functionality (seals) of the article. With regard to the adhering combination of different thermoplastics it is known to join different plastics adheringly to one another by direct molding-on in multicomponent injection molding, e.g., two-component injection molding. To promote adhesion, recommendations have been made for this purpose, in DE-B 103 08 727, DE-A 103 08 989, and by Simon Amesöder et al., Kunststoffe Sep. 2003, pages 124 to 129, for certain combinations of materials, to treat the surface of one component with plasma and then to mold on the other component to this plasma-treated surface.

A disadvantage of the technical teachings known to date are the unsatisfactory combinations of materials for numerous applications. It is specifically those combinations of materials in which a solid, rigid, and very inexpensive support is provided with a surface which is optimized in terms of tactility, optical qualities, functionality, and, preferably abrasion resistance as well that are combinations which are particularly of interest and desirable.

It was an object of the present invention, accordingly, to develop an adhering combination of materials in which an extremely favorable support, which preferably also has very good mechanical properties, and in particular possesses a high abrasion resistance, is joined adheringly to a material which possesses very good tactility, optical qualities, and, preferably, scratch resistance as well. This composite element ought to be distinguished by efficient and effective manufacture and also by extremely good adhesion even without the use of adhesion promoters.

These objects have been achieved by the articles described at the outset.

The articles of the invention are distinguished by the directly adhering joining of a thermoplastically processable plastic which is outstandingly suitable as support material, i.e., the polystyrene, to a thermoplastic which scores very highly in optical qualities and tactility, in this case thermoplastic polyurethane. A polystyrene/thermoplastic polyurethane composite element of this kind has not been known to date, and in particular was not obtainable without a chemical adhesion promoter. For numerous applications, this combination of materials, by virtue of its direct adhering join, i.e., without the use of chemical adhesion promoters, solvents or, in particular, adhesives, opens up new, hitherto-unknown qualitative opportunities for adding value. Preferred articles in accordance with the invention are covers with seals, housings with seals, handles, gearshift knobs, covers and strips with molded-on antirattle protection, housings with antiimpact, anticollision, and antiwear protection (vacuum-cleaner casings with collision-resistant edge, lawnmower casings). For these articles in particular it is possible in accordance with the present invention to use thermoplastic polyurethane to "enhance" the surface of—in polystyrene—a thermoplastic whose mechanical properties make it a very suitable support material, and to do so, in accordance with the invention, without using chemical adhesion promoters and/or solvents and hence without employing complex additional steps. This gives thermoplastic polyurethane the advantage of superior tactility, while at the same time an optically involved surface can be produced, since TPU is very good at accepting patterning from mold surfaces. TPU is additionally distinguished by a very low level of surface soiling and in terms of color can be varied within wide ranges using pigment concentrates. Preference is given, therefore, in accordance with the invention to articles in which the thermoplastic polyurethane constitutes the visible surface.

The articles of the invention are preferably multicomponent, preferably two-component, injection-molded articles—that is, articles produced by multicomponent injection molding, preferably two-component injection molding. Two-component injection molding is common knowledge for other combinations of materials and has been diversely described. Normally, one component is injected in a mold and then the second component is molded on. The insertion of one component, preferably of an article based on polystyrene, into one mold, followed by injection molding onto the plasma-treated surface of the polypropylene article, can be carried out alternatively.

The thermoplastic polyurethane of the invention is preferably a thermoplastic polyurethane having a Shore hardness of 45 A to 80 A, a DIN 53504 tensile strength of more than 15 MPa, a DIN 53515 tear propagation resistance of more than 30 N/mm, and a DIN 53516 abrasion of less than 250 mm$^3$.

The articles of the invention are also distinguished in particular by the outstanding adhesion between the polystyrene and the thermoplastic polyurethane. Preference is therefore also given in particular to articles wherein the DIN EN 1464 peel resistance is at least 1 N/mm, preferably at least 2 N/mm.

A further object was to develop an extremely efficient and effective process by which the articles described at the outset can be produced, and in particular by which the adhering join can be achieved with simple means.

This object has been achieved by processes for producing an article comprising thermoplastic polyurethane and polystyrene, preferably articles comprising polystyrene and thermoplastic polyurethane joined adheringly without chemical adhesion promoter, which involves plasma-treating the surface of a polystyrene article and then contacting the thermoplastic polyurethane, preferably in the melted state, with the plasma-treated surface, preferably by molding it on by injection molding. With particular preference, therefore, the second component is applied—in particular, molded on—to the plasma-treated surface of the first component by injection molding.

By virtue of this process of the invention it is possible for the first time to achieve an adhering join between polystyrene and thermoplastic polyurethane without chemical adhesion promoters. The fact that at the same time this is achieved by means of an effective and efficient process is of additional advantage. The process of the invention, i.e., the promotion of adhesion by means of plasma treatment, can be used in processes which are common knowledge for the thermoplastic processing of plastics. For example, the plasma treatment can be applied to the surface of an extruded plastic sheet onto which the other plastic is subsequently extruded or, preferably, molded on by injection molding. A further possibility is to insert one plastic, preferably the polystyrene, in the form of a molding into an injection mold, to treat it with plasma, and then to mold-on, by injection, the other plastic, preferably the thermoplastic polyurethane, onto the plasma-treated surface. Preferably, the surface of the polystyrene will be plasma-treated and then thermoplastic polyurethane will be applied, preferably molded on, to the plasma-treated surface of the polystyrene by injection molding.

Particular preference is given to two-component injection molding, where, preferably in a single injection mold, in a first step a first injection molding is produced using polystyrene, then the surface of this first injection molding is plasma-treated, and thereafter thermoplastic polyurethane is applied, preferably molded on, by injection molding to the plasma-treated surface of the first injection molding. Injection molding, and also multicomponent injection molding, both directly and in an insertion process, where one article is inserted into an injection mold, are common knowledge.

Plasma treatment is common knowledge and is described, for example, in the publications cited at the outset. Plasma treatment apparatus is available, for example, from Plasmatreat GmbH, Bisamweg 10, 33803 Steinhagen, Germany and also from TIGRES Dr. Gerstenberg GmbH, Mühlenstraße 12, 25462 Rellingen, Germany.

Preferably, high-voltage discharge will be used to generate a plasma in a plasma source, this plasma will be contacted by means of a plasma nozzle with the surface of one component, preferably the polystyrene, and the plasma source will be moved at a distance of between 2 mm and 25 mm with a speed of between 0.1 m/min and 400 m/min preferably between 0.1 m/min and 200 m/min, more preferably between 0.2 m/min and 50 m/min, relative to the surface of the component which is being plasma-treated. The plasma will preferably be transported by means of a gas flow along the discharge section to the surface of the thermoplastic to be treated. Activated particles of the plasma, which make the surface of the plastic ready for adhesion, include, in particular, ions, electrons, free radicals, and photons. The plasma treatment lasts preferably between 1 ms and 100 s. Gases which can be used include oxygen, nitrogen, carbon dioxide, and mixtures of the aforementioned gases, preferably air, and in particular compressed air. The gas flow can amount to up to 2 $m^3$/h per nozzle. The operating frequency can be between 10 and 30 kHz. The excitation voltage or electrode voltage can be between 5 and 10 kV. Stationary or rotating plasma nozzles are suitable. The surface temperature of the component can be between 5° C. and 250° C., preferably between 5° C. and 200° C.

The injection molding of thermoplastics is common knowledge and has been described diversely not least, in particular, for polystyrene and thermoplastic polyurethane. For instance, the principle of two-component injection molding is depicted in FIG. 2 in Simon Amesöder et al., Kunststoffe Sep. 2003, pages 124 to 129.

The temperature when injection molding thermoplastic polyurethane is preferably between 140 and 250° C., more preferably between 160 and 230° C. TPUs are preferably processed very gently. The temperatures can be adapted in accordance with the hardness. The circumferential speed during plastication is preferably less than or equal to 0.2 n/s and the backpressure is preferably between 30 to 200 bar. The injection rate is preferably very low, in order to minimize shearing stress. The cooling time chosen should preferably be sufficiently long, with the hold pressure preferably amounting to 30 between 80% of the injection pressure. The molds are preferably controlled at a temperature of between 30 and 70° C. Gating is preferably chosen to be at the strongest point of the component. In the case of substantially two-dimensional over-injections it is possible to use a cascaded arrangement of feed points.

The temperature when injection molding polystyrene is preferably between 200 and 280° C., more preferably between 200 and 260° C. The machine temperatures set can be preferably between 210 and 280° C., the feed section preferably at 30-50° C. The injection pressure is normally 600-1600 bar. The hold pressure is preferably maintained at 30%-60% of the injection pressure. Plastication is preferably carried out with up to 1.3 m/s circumferential screw speed, but with particular preference can be carried out only at a rate such that the plastication process is over within the cooling time. The backpressure to be used can be preferably between 50 and 150 bar. Gating can take place preferably at the strongest point of the component.

The following comments may be made by way of example on the two components, polystyrene and thermoplastic polyurethane.

The general expression "polystyrene" comprehends in this text not only the actual, standard polystyrene (GPPS) but also HIPS and known ABS and ASA plastics.

As the polystyrene it is possible to use polystyrene of common knowledge. Polystyrene is described for example in Römpp Chemie Lexikon, 9th edition, page 3570 ff., Georg Thieme Verlag, Stuttgart. Particularly suitable are polymers containing the following structural unit: —[$CH(C_6H_5)$—$CH_2$]$_n$—, where n is preferably chosen such that the polymer has a molar mass, preferably a weight-average molar mass, of preferably between 170 000 g/mol and 1 000 000 g/mol.

Besides so-called standard polystyrene (also referred to as general purpose polystyrene or GPPS), suitability is also possessed by those known as high impact polystyrenes (HIPS), such as those wherein the polystyrene either is in a blend with a rubber component, preferably a polybutadiene component or the polystyrene has been prepared by free-radical or anionic polymerization of styrene in the presence of polybutadiene.

Also suitable are conventional ABS plastics. ABS here stands for acrylonitrile-butadiene-styrene copolymers, especially those in accordance with Römpp Chemie Lexikon, 9th edition, page 12, Georg Thieme Verlag, Stuttgart.

Additionally suitable are conventional ASA plastics. ASA here stands for acrylonitrile-styrene-acrylate copolymers, especially those in accordance with Römpp Chemie Lexikon, 9th edition, page 262, Georg Thieme Verlag, Stuttgart.

Suitable polystyrene also includes blends comprising polystyrene together, for example, with other thermoplastics, preferably blends in which the polystyrene content is at least 50%, more preferably at least 90%, and in particular 100% by weight.

Particularly preferred as polystyrene are polymers containing the following structural unit: —[CH($C_6H_5$)—$CH_2$]$_n$—, where n is preferably chosen such that the polymer has a molar mass, preferably a weight-average molar mass, of preferably between 170 000 g/mol and 1 000 000 g/mol.

Thermoplastic polyurethanes, also referred to in this text as TPUs, and processes for preparing them are common knowledge. Generally speaking, TPUs are prepared by reacting (a) isocyanates with (b) isocyanate-reactive compounds, usually with a molecular weight ($M_w$) of 500 to 10 000, preferably 500 to 5000, more preferably 800 to 3000 and (c) chain extenders having a molecular weight of 50 to 499, in the presence if appropriate of (d) catalysts and/or (e) customary additives.

The purpose of the text below is to depict in an exemplary fashion the starting components and process for preparing the preferred polyurethanes. The components (a), (b), (c) and, if appropriate (d) and/or (e) commonly used in preparing the polyurethanes will be described by way of example below:

a) organic isocyanates (a) which can be used are well-known aliphatic, cycloaliphatic, araliphatic and/or aromatic isocyanates, examples being tri-, tetra-, penta-, hexa-, hepta- and/or octamethylene diisocyanate, 2-methylpenta-methylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, HXDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), diphenylmethane diisocyanate, 3,3'-dimethyldiphenyl diisocyanate, 1,2-diphenylethane diisocyanate and/or phenylene diisocyanate. Preference is given to using 4,4'-MDI. For powder slush applications preference is also given, as described at the outset to aliphatic isocyanates, more preferably 1-isocyanato-3,3,5-trimethyl-5-isocyanatomethylcyclohexane (isophorone diisocyanate, IPDI) and/or hexamethylene diisocyanate (HDI), especially hexamethylene diisocyanate. As already described at the outset it is also possible as isocyanate (a) to use prepolymers which contain free isocyanate groups. The NCO content of these prepolymers is preferably between 10% and 25%. The prepolymers may offer the advantage that, owing to the preliminary reaction during the preparation of the prepolymers, a lower reaction time is needed for the preparation of the TPUs.

b) Isocyanate-reactive compounds (b) which can be used are the well-known isocyanate-reactive compounds, examples being polyesterols, polyetherols and/or polycarbonatediols, normally referred to collectively as "polyols", having molecular weights of between 500 and 8000, preferably 600 to 6000, in particular 800 to less than 3000, and preferably having an average functionality toward isocyanates of 1.8 to 2.3, preferably 1.9 to 2.2, in particular 2. Preference is given to using polyetherpolyols, examples being those based on well-known starter substances and customary alkylene oxides, examples being ethylene oxide, propylene oxide and/or butylene oxide, preference being given to polyetherols based on propylene 1,2-oxide and ethylene oxide, and particularly to polyoxytetramethylene glycols. The polyetherols have the advantage of a greater stability to hydrolysis than polyesterols.

The polyetherols used may also include what are known as low-unsaturation polyetherols. Low-unsaturated polyols for the purposes of this invention are, in particular, polyether alcohols having an unsaturated compound content of less than 0.02 meg/g, preferably less than 0.01 meg/g.

Polyether alcohols of this kind are mostly prepared by addition reaction of alkylene oxides, especially ethylene oxide, propylene oxide, and mixtures thereof, with the above-described diols or triols in the presence of high-activity catalysts. Examples of high-activity catalysts of this kind include cesium hydroxide and multimetal cyanide catalysts, also termed DMC catalysts. One DMC catalyst frequently employed is zinc hexacyanocobaltate. The DMC catalyst can be left in the polyether alcohol after the reaction, but is usually removed, by sedimentation or filtration, for example.

Additionally it is possible to use polybutadienediols having a molar mass of 500-10 000 g/mol, preferably 1000-5000 g/mol, in particular 2000-3000 g/mol. TPUs produced using these polyols can be radiation-crosslinked after thermoplastic processing. This leads to improved combustion performance, for example.

Instead of one polyol it is also possible to use mixtures of different polyols.

c) Chain extenders (c) which can be used include well-known aliphatic, araliphatic, aromatic and/or cycloaliphatic compounds having a molecular weight of 50 to 499, preferably difunctional compounds, examples being diamines and/or alkanediols having 2 to 10 carbon atoms in the alkylene radical, especially 1,3-propanediol, butane-1,4-diol, hexane-1,6-diol and/or di-, tri-, tetra-, penta-, hexa-, hepta-, octa-, nona- and/or decaalkylene glycols having 3 to 8 carbon atoms, preferably corresponding oligopropylene and/or polypropylene glycols, with use of mixtures of the chain extenders also being possible.

With particular preference components a) to c) are difunctional compounds, i.e., diisocyanates (a), difunctional polyols, preferably polyetherols (b) and difunctional chain extenders, preferably diols.

d) Suitable catalysts which accelerate, in particular, the reaction between the NCO groups of the diisocyanates (a) and the hydroxyl groups of the synthesis components (b) and (c) are the customary prior-art tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, and the like, and also, in particular, organometallic compounds such as titanic esters, iron compounds such as iron(III) acetylacetonate, tin compounds, e.g., tin diacetate, tin dioctoate, tin dilaurate, or the tin dialkyl salts of aliphatic carboxylic acids, such as dibutyltin diacetate, dibutyltin dilaurate or the like. The catalysts are usually used in amounts of 0.0001 to 0.1 part by weight per 100 parts by weight of polyhydroxyl compound (b).

e) As well as catalysts (d) it is also possible to add customary auxiliaries and/or additives (e) to the synthesis components (a) to (c). Mention may be made, by way of example, of blowing agents, surface-active substances, fillers, nucleators, lubricants and mold release aids, dyes and pigments, antioxidants, to counter hydrolysis, light, heat or discoloration, for example, organic and/or inorganic fillers, flame retardants, reinforcing agents, plasticizers, and metal deactivators. In one preferred embodiment component (e) also embraces hydrolysis preventatives such as polymeric and low molecular mass carbodiimides, for example. With particular preference the thermoplastic polyurethane in the materials of the invention comprises melamine cyanurate, which acts as a flame retardant. Melamine cyanurate is used preferably in an amount between 0.1% and 60%, preferably between 5% and 40%, and in particular between 15% and 25% by weight, based in each case on the overall weight of the TPU. The thermoplastic polyurethane preferably comprises triazole and/or triazole derivative and antioxidants in an amount of 0.1% to 5% by weight, based on the overall weight of the thermoplastic polyurethane. Suitable antioxidants are, in general, substances which inhibit or prevent unwanted oxidative processes in the plastic to be protected. Generally speaking, antioxidants are available commercially. Examples of antioxidants are sterically hindered phenols, aromatic amines, thiosynergists, organophosphorus compounds of trivalent phosphorus, and hindered amine light stabilizers. Examples of sterically hindered phenols are found in Plastics Additive Handbook, 5th edition, H. Zweifel, ed., Hanser Publishers, Munich, 2001 ([1]), pp. 98-107 and pp. 116-121. Examples of aromatic amines are found in [1] pp. 107-108. Examples of thiosynergists are given in [1], pp. 104-105 and pp. 112-113. Examples of phosphates are found in [1], pp. 109-112. Examples of hindered amine light stabilizers are given in [1], pp. 123-136. Antioxidants suitable for use are phenolic antioxidants. In one preferred embodiment the antioxidants, particularly the phenolic antioxidants, have a molar mass of more than 350 g/mol, more preferably of more than 700 g/mol, and a maximum molar mass<10 000 g/mol, preferably <3000 g/mol. In addition they preferably possess a melting point of less than 180° C. Moreover, it is preferred to use antioxidants which are amorphous or liquid. As component (i) it is also possible to use mixtures of two or more antioxidants.

Besides the stated components a), b), and c) and, if appropriate, d) and e) it is also possible to use chain regulators, usually having a molecular weight of 31 to 3000. These chain regulators are compounds which have only one isocyanate-reactive functional group, such as monofunctional alcohols, monofunctional amines and/or monofunctional polyols, for example. Chain regulators of this kind allow a precise rheology to be set, particularly in the case of TPUs. Chain regulators can be used generally in an amount of 0 to 5, preferably 0.1 to 1, part(s) by weight, based on 100 parts by weight of component b), and in terms of definition are included in component (c).

All of the molecular weights stated in this text have the unit [g/mol].

To adjust the hardness of the TPUs it is possible to vary the synthesis components (b) and (c) in relatively wide molar ratios. Ratios which have been found appropriate are molar ratios of component (b) to chain extenders (c) for use in total of 10:1 to 1:10, in particular of 1:1 to 1:4, the hardness of the TPUs increasing as the amount of (c) goes up.

As the thermoplastic polyurethane it is preferred to use soft, plasticizer-free thermoplastic polyurethane with a hardness of preferably up to 90 Shore A in particular for applications in the tactile and optical sector. In antiwear and anticollision applications, suitable TPUs include all those of up to 80 Shore D. In hydrolytically sensitive applications, ether TPUs are preferred. In applications particularly involving light exposure, aliphatic TPUs are preferred. The thermoplastic polyurethane preferably has a number-average molecular weight of at least 40 000 g/mol, more preferably at least 80 000 g/mol, and in particular at least 120 000 g/mol.

With particular preference the thermoplastic polyurethane has a Shore hardness of 45 A to 80 A, a DIN 53504 tensile strength of more than 15 MPa, a DIN 53515 tear propagation resistance of more than 30 N/mm, and a DIN 53516 abrasion of less than 250 mm$^3$.

On account of their particularly good adhesion, TPUs in accordance with WO 03/014179 are preferred. The comments below, up to the examples, relate to these particularly preferred TPUs. The reason for the particularly effective adhesion of these TPUs is that the processing temperatures are higher than in the case of other "classic" TPUs with comparable hardnesses, and it is under these conditions that the best adhesive strengths can be obtained. These particularly preferred TPUs are preferably obtainable by reacting (a) isocyanates with (b1) polyesterdiols having a melting point of more than 150° C., (b2) polyetherdiols and/or polyesterdiols each having a melting point of less than 150° C. and a molecular weight of 501 to 8000 g/mol, and, if appropriate, (c) diols having a molecular weight of 62 g/mol to 500 g/mol. Particularly preferred in this context are thermoplastic polyurethanes in which the molar ratio of the diols (c) having a molecular weight of 62 g/mol to 500 g/mol to component (b2) is less than 0.2, more preferably 0.1 to 0.01. Particularly preferred thermoplastic polyurethanes are those in which the polyesterdiols (b1), which preferably possess a molecular weight of 1000 g/mol to 5000 g/mol, contain the following structural unit (I):

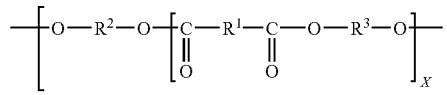

with the following definitions for $R^1$, $R^2$, and X:

$R^1$: a carbon framework of 2 to 15 carbon atoms, preferably an alkylene group of 2 to 15 carbon atoms and/or a divalent aromatic radical of 6 to 15 carbon atoms, more preferably of 6 to 12 carbon atoms, $R^2$: an optionally branched-chain alkylene group of 2 to 8 carbon atoms, preferably 2 to 6, more preferably 2 to 4 carbon atoms, especially —$CH_2$—$CH_2$— and/or —$CH_2$—$CH_2$—$CH_2$—$CH_2$—, $R^3$: an optionally branched-chain alkylene group of 2 to 8 carbon atoms, preferably 2 to 6, more preferably 2 to 4 carbon atoms, especially —$CH_2$—$CH_2$— and/or —$CH_2$—$CH_2$—$CH_2$—$CH_2$—, X: an integer from the range 5 to 30. The preferred melting point and/or the preferred molecular weight described at the outset refer, in the base of this preferred embodiment, to the structural unit (I) depicted.

The expression "melting point" refers in this text to the maximum of the melting peak of a heating curve measured using a commercial DSC instrument (e.g., DSC 7 from Perkin-Elmer).

The molecular weights specified in this text represent the number-average molecular weights in [g/mol].

These particularly preferred thermoplastic polyurethanes can be prepared preferably by reacting a thermoplastic polyester, preferably of high molecular mass and preferably partly crystalline, with a diol (c) and then reacting the reaction product of (i) comprising (b1) polyesterdiol with a melting point of more than 150° C. and also, if appropriate, (c) diol together with (b2) polyetherdiols and/or polyesterdiols each having a melting point of less than 150° C. and a molecular weight of 501 to 8000 g/mol, and also, if appropriate, further (c) diols having a molecular weight of 62 to 500 g/mol, with (a) isocyanate, in the presence if appropriate of (d) catalysts and/or (e) auxiliaries.

In the case of the reaction (ii) the molar ratio of the diols (c) having a molecular weight of 62 g/mol to 500 g/mol to component (b2) is preferably less than 0.2, more preferably 0.1 to 0.01.

While as a result of step (i) the hard phases are made available for the end product as a result of the polyester used in step (i), the use of component (b2) in step (ii) builds up the soft phases. The preferred technical teaching is that polyesters having a pronounced, readily crystallizing hard-phase structure melt preferentially in a reaction extruder and are first of all broken down with a low molecular mass diol to form shorter polyesters having free hydroxyl end groups. In this case the original high crystallization tendency of the polyester is retained and can subsequently be utilized in order, in the case of rapidly proceeding reaction, to obtain TPUs having the advantageous properties, which are high tensile strength values, low abrasion values, and, on account of the higher narrow melting range, high heat distortion resistances and low compression sets. Preferably, therefore, in accordance with the preferred process, high molecular mass, partially crystalline, thermoplastic polyesters are broken down with low molecular mass dials (c) under suitable conditions in a short reaction time to give rapidly crystallizing polyesterdiols (b1), which in turn are then bound up with other polyesterdiols and/or polyetherdiols and diisocyanates into polymer chains of high molecular mass.

The thermoplastic polyester used, i.e., prior to the reaction (i) with the diol (c), has a molecular weight of preferably 15 000 g/mol to 40 000 g/mol and a melting point of preferably more than 160° C., more preferably of 170° C. to 260° C.

As the starting product, i.e., as the polyester which is reacted in step (i), preferably in the melted state, more preferably at a temperature of 230° C. to 280° C., for a time of preferably 0.1 min to 4 min, more preferably 0.3 min to 1 min, with the diol or diols (c) it is possible to use well-known thermoplastic polyesters, preferably of high molecular mass and preferably partially crystalline, which are in pelletized form, for example. Suitable polyesters are based for example on aliphatic, cycloaliphatic, araliphatic and/or aromatic dicarboxylic acids, lactic acid and/or terephthalic acid for example, and on aliphatic, cycloaliphatic, araliphatic and/or aromatic dialcohols, examples being ethane-1,2-diol, butane-1,4-diol and/or hexane-1,6-diol.

Particularly preferred polyesters used are as follows: poly-L-lactic acid and/or polyalkylene terephthalate, such as polyethylene terephthalate, polypropylene terephthalate or polybutylene terephthalate, especially polybutylene terephthalate.

The preparation of these esters from the stated starting materials is common knowledge to the skilled worker and has been described in many instances. Suitable polyesters, moreover, are available commercially.

The thermoplastic polyester is melted preferably at a temperature at 180° C. to 270° C. The reaction (i) with the diol (c) is carried out preferably at a temperature of 230° C. to 280° C., preferably 240° C. to 280° C.

As diol (c) in step (i) for reaction with the thermoplastic polyester, and if appropriate in step (ii), it is possible to use well-known diols having a molecular weight of 62 to 500 g/mol, examples being those specified later on, e.g., ethylene glycol, 1,3-propanediol, 1,4-butanediol, 1,5-pentanediol, 1,6-hexanediol, heptanediol, octanediol, preferably butane-1,4-diol and/or ethane-1,2-diol.

The weight ratio of thermoplastic polyester to diol (c) in step (i) is usually 100:1.0 to 100:10, preferably 100:1.5 to 100:8.0.

The reaction of the thermoplastic polyester with the diol (c) in reaction step (i) is carried out preferably in the presence of customary catalysts, examples being those described later on. For this reaction it is preferred to use catalysts based on metals. The reaction in step (i) is conducted preferably in the presence of 0.1% to 2% by weight of catalysts, based on the weight of the diol (c). Reaction in the presence of such catalysts is advantageous in order to be able to allow the reaction to be carried out in the short residence time available in the reactor, a reaction extruder for example.

Examples of suitable catalysts for this reaction step (i) include the following: tetrabutyl orthotitanate and/or tin(II) dioctoate, preferably tin dioctoate.

The polyesterdiol (b1), as the reaction product from (i), has a molecular weight of preferably 1000 g/mol to 5000 g/mol. The melting point of the polyesterdiol, as a reaction product from (i), is preferably 150° C. to 260° C., in particular 165 to 245° C.; in other words, the reaction product of the thermoplastic polyester with the diol (c) in step (i) comprises compounds having the stated melting point, which can be used in the subsequent step (ii).

The reaction of the thermoplastic polyester with the diol (c) in step (i) results in cleavage of the polymer chain of the polyester by the diol (c), by means of transesterification. The reaction product of the TPU therefore contains free hydroxyl end groups and is processed further preferably in the further step (ii) to form the actual product, the TPU.

The reaction of the reaction product from step (i) in step (ii) takes place preferably by addition of a) isocyanate (a) and also (b2) polyetherdiols and/or polyesterdiols each having a melting point of less than 150° C. and a molecular weight of 501 to 8000 g/mol and also, if appropriate, further diols (c) having a molecular weight of 62 to 500 (d) catalysts and/or (e) auxiliaries to the reaction product from (i). The reaction of the reaction product with the isocyanate takes place via the hydroxyl end groups formed in step (i). The reaction in step (ii) takes place preferably at a temperature of 190° C. to 250° C. for a time of preferably 0.5 to 5 min, more preferably 0.5 to 2 min, preferably in a reaction extruder, and with particular preference in the same reaction extruder used for carrying out step (i) as well. By way of example, the reaction of step (i) can take place in the first barrels of a customary reaction extruder and the corresponding reaction of step (ii) can be carried out at a later point, i.e., subsequent barrels, following the addition of components (a) and (b2). By way of example, the first 30% to 50% of the length of the reaction extruder can be utilized for step (i), and the remaining 50% to 70% for step (ii).

The reaction in step (ii) takes place preferably with an excess of the isocyanate groups over the isocyanate-reactive groups. In the reaction (ii) the ratio of the isocyanate groups to the hydroxyl groups is preferably 1:1 to 1.2:1, more preferably 1.02:1 to 1.2:1.

Reactions (i) and (ii) are preferably carried out in a well-known reaction extruder. Reaction extruders of this kind are described by way of example in the brochures from Werner & Pfleiderer or in DE-A 2 302 564.

The preferred process is preferably carried out by metering at least one thermoplastic polyester, polybutylene terephthalate for example, into the first barrel of a reaction extruder and melting it at temperatures preferably between 180° C. to 270° C., preferably 240° C. to 270° C., in a subsequent barrel adding a diol (c), butanediol for example, and preferably a transesterification catalyst, at temperatures between 240° C. to 280° C. breaking down the polyester by means of the diol (c) to give polyester oligomers having hydroxyl end groups and molecular weights between 1000 to 5000, in a subsequent barrel metering in isocyanate (a) and (b2) isocyanate-reactive compounds having a molecular weight of 501 to 8000 g/mol and also, if appropriate, (c) diols having a molecular weight of 62 to 500, (d) catalysts and/or (e) auxiliaries, and then carrying out the synthesis at temperatures of 190 to 250° C. to give the preferred thermoplastic polyurethanes.

In step (ii) it is preferred not to supply any (c) diols having a molecular weight of 62 to 500, with the exception of the (c) diols having a molecular weight of 62 to 500 that are comprised in the reaction product from (i).

In the region in which the thermoplastic polyester is melted, the reaction extruder preferably has neutral and/or backward-conveying kneading blocks and back-conveying elements, and in the region in which the thermoplastic polyester is reacted with the diol it preferably has screw mixing elements, toothed disks and/or toothed mixing elements in combination with back-conveying elements.

Downstream of the reaction extruder the clear melt is usually supplied by means of a gear pump to an underwater pelletizer, and is pelletized.

The particularly preferred thermoplastic polyurethanes exhibit optically clear, single-phase melts which solidify rapidly and, as a consequence of the partially crystalline polyester hard phase, form slightly opaque to untransparently white moldings. The rapid solidification behavior is a decisive advantage in relation to known formulas and production processes for thermoplastic polyurethanes. The rapid solidification behavior is so pronounced that even products having hardnesses of 50 to 60 Shore A can be processed by injection molding with cycle times of less than 35 S. In extrusion as well, such as in the production of blown films, for example, none of the problems typically associated with TPUs occur, such as sticking or blocking of the films or bubbles.

The fraction of the thermoplastic polyester in the end product, i.e., the thermoplastic polyurethane, is preferably 5% to 75% by weight. With particular preference the preferred thermoplastic polyurethanes represent products of the reaction of a mixing comprising 10% to 70% by weight of the reaction product from (I), 10% to 80% by weight of (b2), and 10% to 20% by weight of (a), the weight figures being based on the overall weight of the mixture comprising (a), (b2), (d), (e) and the reaction product from (i).

The preferred thermoplastic polyurethanes preferably have a hardness of Shore 45 A to Shore 78 D, more preferably 50 A to 75 D.

The preferred thermoplastic polyurethanes preferably contain the following structural unit (II):

between 501 g/mol and 8000 g/mol as (b2) or from the use of alkanediols having 2 to 12 carbon atoms for the reaction with diisocyanates, x: an integer from the range 5 to 30, n, m: an integer from the range 5 to 20.

The radical $R^1$ is defined by the isocyanate employed, the radical $R^2$ by the reaction product of the thermoplastic polyester with the diol (c) in (i); and the radical $R^3$ by the starting components (b2) and, if appropriate, (c) during the preparation of the TPUs.

EXAMPLES

In a two-component injection molding operation, polystyrene PS 143E from BASF Aktiengesellschaft and Elastollan® C 65 A 15 HPM were joined to one another. The composite showed very little if any adhesion. In a second experiment the PS143E component was subjected to a plasma treatment before having the Elastollan® TPU molded on, and directly thereafter the TPU was molded on. Adhesion to the plasma-treated surface is durably so high that the components cannot be separated from one another without destruction.

The invention claimed is:

1. An article comprising polystyrene and thermoplastic polyurethane joined adheringly without chemical adhesion promoter, wherein said article has a DIN EN 1464 peel resistance of at least 1 N/mm.

2. The article of claim 1, wherein said article is a two-component injection-molded article.

3. The article of claim 1, wherein said thermoplastic polyurethane has a Shore A hardness of less than 95 and comprises no plasticizers.

4. The article of claim 1, wherein said thermoplastic polyurethane constitutes the visible surface of said article.

5. The article of claim 1, wherein said thermoplastic polyurethane has a Shore hardness of 45 A to 80 A, a DIN 53504 tensile strength of more than 15 MPa, a DIN 53515 tear propagation resistance of more than 30 N/mm, and a DIN 53516 abrasion of less than 250 mm$^3$.

6. The article of claim 1, wherein said article has a DIN EN 1464 peel resistance of at least 2 N/mm.

7. A process for producing an article comprising thermoplastic polyurethane and polystyrene, comprising (1) plasma-treating the surface of a polystyrene article and (2) contacting thermoplastic polyurethane with the plasma-treated surface of said polystyrene article.

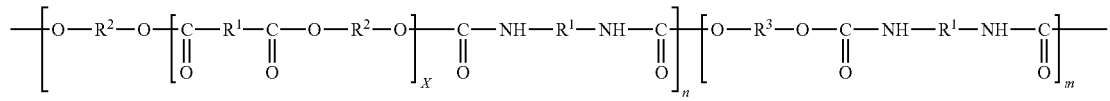

having the following definitions for $R^1$, $R^2$, $R^3$, and X:

$R^1$: a carbon framework of 2 to 15 carbon atoms, preferably an alkylene group of 2 to 15 carbon atoms and/or an aromatic radical of 6 to 15 carbon atoms, $R^2$: an optionally branched-chain alkylene group of 2 to 8 carbon atoms, preferably 2 to 6, more preferably 2 to 4 carbon atoms, especially —CH$_2$—CH$_2$— and/or —CH$_2$—CH$_2$—CH$_2$—CH$_2$—, $R^3$: a radical resulting from the use of polyetherdiols and/or polyesterdiols having in each case molecular weights of 8. The process of claim 7, wherein said thermoplastic polyurethane is applied by injection molding to the plasma-treated surface of the polystyrene.

9. The process of claim 7, wherein said polystyrene article is an injection-molded article prepared from polystyrene by multicomponent injection molding and wherein said thermoplastic polyurethane is applied by injection molding to the plasma-treated surface of said polystyrene article.

10. The process of claim 9, wherein said multicomponent injection molding is two-component injection molding.

11. The process of claim 9, wherein said plasma-treatment is achieved by contacting plasma from a plasma source with the surface of said polystyrene article, wherein high-voltage discharge is used to generate a plasma in a plasma source, and wherein said plasma source is moved at a distance of between 2 mm and 25 mm at a speed between 0.1 m/min and 400 m/min relative to the surface of the polystyrene article being plasma-treated.

12. The process of claim 7, wherein said plasma treatment lasts between 1 ms and 100 s.

13. The process of claim 7, wherein said thermoplastic polyurethane has a Shore A hardness of less than 95 and comprises no plasticizers.

14. The process of claim 7, wherein said thermoplastic polyurethane has a Shore hardness of 45 A to 80 A, a DIN 53504 tensile strength of more than 15 MPa, a DIN 53515 tear propagation resistance of more than 30 N/mm, and a DIN 53516 abrasion of less than 250 $mm^3$.

15. An article comprising thermoplastic polyurethane and polystyrene prepared by the process of claim 7.

* * * * *